United States Patent
Hauenstein et al.

(10) Patent No.: US 11,936,811 B2
(45) Date of Patent: Mar. 19, 2024

(54) METHOD FOR PROVIDING AN EMERGENCY RESPONSE SERVICE AND EMERGENCY RESPONSE SERVICE SYSTEM

(71) Applicant: Unify Patente GmbH & Co. KG, Munich (DE)

(72) Inventors: Nadya Hauenstein, Curitiba (BR); William Bley, Curitiba (BR)

(73) Assignee: Unify Patente GmbH & Co. KG, Munich (DE)

( * ) Notice: Subject to any disclaimer, the term of this patent is extended or adjusted under 35 U.S.C. 154(b) by 62 days.

(21) Appl. No.: 17/762,202

(22) PCT Filed: Oct. 14, 2019

(86) PCT No.: PCT/EP2019/077804
§ 371 (c)(1),
(2) Date: Mar. 21, 2022

(87) PCT Pub. No.: WO2021/073715
PCT Pub. Date: Apr. 22, 2021

(65) Prior Publication Data
US 2023/0344936 A1    Oct. 26, 2023

(51) Int. Cl.
*H04L 12/00* (2006.01)
*H04L 67/12* (2022.01)
(Continued)

(52) U.S. Cl.
CPC ........... *H04M 3/5116* (2013.01); *H04L 67/12* (2013.01); *H04L 67/52* (2022.05); *G16Y 20/10* (2020.01)

(58) Field of Classification Search
CPC ...... H04M 3/5116; H04L 67/12; H04L 67/52; G16Y 20/10
(Continued)

(56) References Cited

U.S. PATENT DOCUMENTS 7,177,399 B2 * 2/2007 Dawson ............ H04M 3/42229
370/352
8,509,225 B2 * 8/2013 Grabelsky ............ H04Q 3/0025
370/352
(Continued)

FOREIGN PATENT DOCUMENTS

WO        2014018387 A2    1/2014
WO    WO-2014018387 A2 *  1/2014   ......... H04L 65/1006

OTHER PUBLICATIONS

International Search Report for PCT/EP2019/077804 dated Dec. 13, 2019.
(Continued)

*Primary Examiner* — Frantz Coby
(74) *Attorney, Agent, or Firm* — Buchanan Ingersoll & Rooney PC

(57) ABSTRACT

A method of providing an emergency response service includes connecting at least one Internet of Things (IoT) device belonging to a subscriber to the SIP server, associating, in the SIP server, the at least one IoT device to the location information, receiving at the SIP server, real time data associated with the emergency situation from the at least one IoT device, and transmitting the real time data associated with the emergency situation to an emergency service routing proxy (ESRP) of an emergency network solution (EsiNet). An emergency response service system can implement embodiments of the method.

18 Claims, 6 Drawing Sheets

(51) Int. Cl.
  *H04L 67/52* (2022.01)
  *H04M 3/51* (2006.01)
  *G16Y 20/10* (2020.01)

(58) Field of Classification Search
  USPC .............................................. 709/217, 201
  See application file for complete search history.

(56) References Cited

U.S. PATENT DOCUMENTS

| | | | |
|---|---|---|---|
| 9,258,687 B2* | 2/2016 | Smith | H04W 72/566 |
| 2008/0052399 A1* | 2/2008 | Nguyen | H04M 7/006 |
| | | | 709/227 |
| 2008/0095098 A1* | 4/2008 | McNamara | H04L 65/4025 |
| | | | 370/328 |
| 2014/0120862 A1* | 5/2014 | Huang | H04W 4/90 |
| | | | 455/404.2 |

OTHER PUBLICATIONS

Written Opinion of the International Searching Authority for PCT/EP2019/077804 dated Dec. 13, 2019.
"NENA Detailed Functional and Interface Standards for NENA i3 Solution NENA Detailed Functional and Interface Standards for the NENA i3 Solution" Feb. 10, 2016, pp. 1-363; Copyright 2016 National Emergency No. Association, Inc.
"EMYNOS: Next generation emergency communication" Evangelos K. Markakis et al., Article in IEEE Communications Magazine • Nov. 2016.

* cited by examiner

METHOD FOR PROVIDING AN EMERGENCY RESPONSE SERVICE AND EMERGENCY RESPONSE SERVICE SYSTEM

CROSS-REFERENCE TO RELATED APPLICATION

The present application is the U.S. national stage application of International Patent Application No. PCT/EP2019/077804.

FIELD

The present invention relates to a method for providing an emergency response service and to an emergency response service system.

BACKGROUND

Currently, the Emergency Response Services in USA and Europe are in transition from legacy PSTN systems to the Next Generation 911 (NG911) based on the Internet Protocol (IP). The advantage of the NG911 is that it allows the support of different communication technologies such as wireless phones, text and picture messaging, video chat, social media, and Voice over Internet Protocol (VoIP) devices.

In this scenario, there are many opportunities for Internet of Things (IoT) implementations. Connected homes and enterprises as well as transportation utilities are becoming a reality with the large development of IoT sensors and monitoring devices. These devices can notify emergency situations, providing a bunch of data including the exact location of the incident.

SUMMARY

We determined that it would be a challenge to connect these private locations to the NG911. Each IoT device vendor develops its own communication protocol. To converge many devices in a single platform some IoT communication frameworks are available but nevertheless, these frameworks need to be enhanced with respect to each new vendor in the market.

Besides that, the emergency response services also would need a dedicated system to handle such information.

Therefore, the present invention is based on the object to provide a method for providing an emergency response service and an emergency response service system according to which more precise emergency data may be provided in the event of an emergency.

Accordingly, a method for providing an emergency response service based on the Internet Protocol (IP) is provided wherein an emergency call initiated by a subscriber due to an emergency situation is received by a Session Initiation Protocol (SIP) server together with location information, and wherein the SIP server associates the location information with the subscriber that initiated the emergency call. The method can include: connecting at least one Internet of Things (IoT) device belonging to the subscriber to the SIP server; associating, in the SIP servers, the at least one IoT device to the location information; receiving at the SIP server, from the at least one IoT device, real time data associated with the emergency situation; and transmitting the real time data associated with the emergency situation to an emergency service routing proxy (ESRP) of an emergency IP network solution (EsiNet).

The integrating of data of IoT devices into the emergency call and response process can allow more precise data to be provided as to the emergency situation. For example, an IoT device as a camera located in the branch office at a location where a fire broke out, is able to provide additional information on the emergency situation, as how severe the fire is, and where it is located exactly. Thus, the handling of an emergency may be improved significantly.

Also, according to the inventive method, an innovative solution is provided so as to unify the information provided by the IoT devices in order to integrate both NG911 systems and security monitoring and measurement devices from a location served by the emergency services.

Preferably, the SIP server is a SIP Proxy, a SIP Session Border Controller, an IP PBX or any other SIP entity. The SIP server can be a computer device that includes a processor connected to a non-transitory memory and at least one transceiver. The SIP server can be communicatively connectable to the IoT devices, ESRP, and the EsiNet. The ESRP can also be a computer device that includes a processor connected to a non-transitory memory and at least one transceiver. The ESRP can be communicatively connectable to the SIP server and the EsiNet as well as to other communication devices (e.g. a public safety answering point (PSAP)).

Preferably, the IoT devices are security monitoring and measurement devices located in or close to a branch office of the subscriber. However, it is also possible that the IoT devices are located somewhere else, i.e., not within the branch office itself.

It is also advantageous, if the method further comprises a step of associating the location information to the subscriber. According to a preferred embodiment of the invention, the location information is associated to the subscriber by assigning it to a single Destination Number DN or a range of DNs, a single IP number of an IP subnet, or to a physical port.

Also, the method may further comprise a step of associating the subscriber and the at least one IoT device.

Preferably, the at least one IoT device is a sensor and/or a monitoring device.

Moreover, according to another preferred embodiment, the method further includes a step of extending Presence Information Data Format (PIDF) for transporting data received from the at least one IoT device to the ESRP.

According to still another preferred embodiment of the invention, the PIDF-LO is used for transporting the location information of the at least one IoT device to the ESRP.

Preferably, the method further includes a step of automatically generating an emergency call from an IoT device event.

Further, the PIDF may comprise a contact element, in particular, a uniform resource locator (URL) of the contact address indicating how a person or entity of at least one IoT device can be reached.

The PIDF may further comprise a timestamp element that designates the time at which the PIDF document was created.

Preferably, the PDIF document is an Extensible Markup Language (XML) document.

Moreover, according to the present invention, an emergency response service system is provided, comprising at least one branch office connected to a VoIP network by a SIP server, the branch office being served by an Emergency IP Network Solution EsiNet, wherein the system is adapted to carry out an embodiment of the method specified above.

According to a preferred embodiment of the invention, at least one IoT device is connected to the SIP server, the at least one IoT device being connected to an IoT management system or to an IoT gateway.

Other details, objects, and advantages of the method for providing an emergency response service, apparatus for providing an emergency response service telecommunications apparatus, system, emergency response service system, non-transitory computer readable medium, and telecommunication method will become apparent as the following description of certain exemplary embodiments thereof proceeds.

BRIEF DESCRIPTION OF THE DRAWINGS

The invention and embodiments thereof will be described below in further detail in connection with the drawing. It should be appreciated that like reference numbers can identify similar components.

Figure 1:
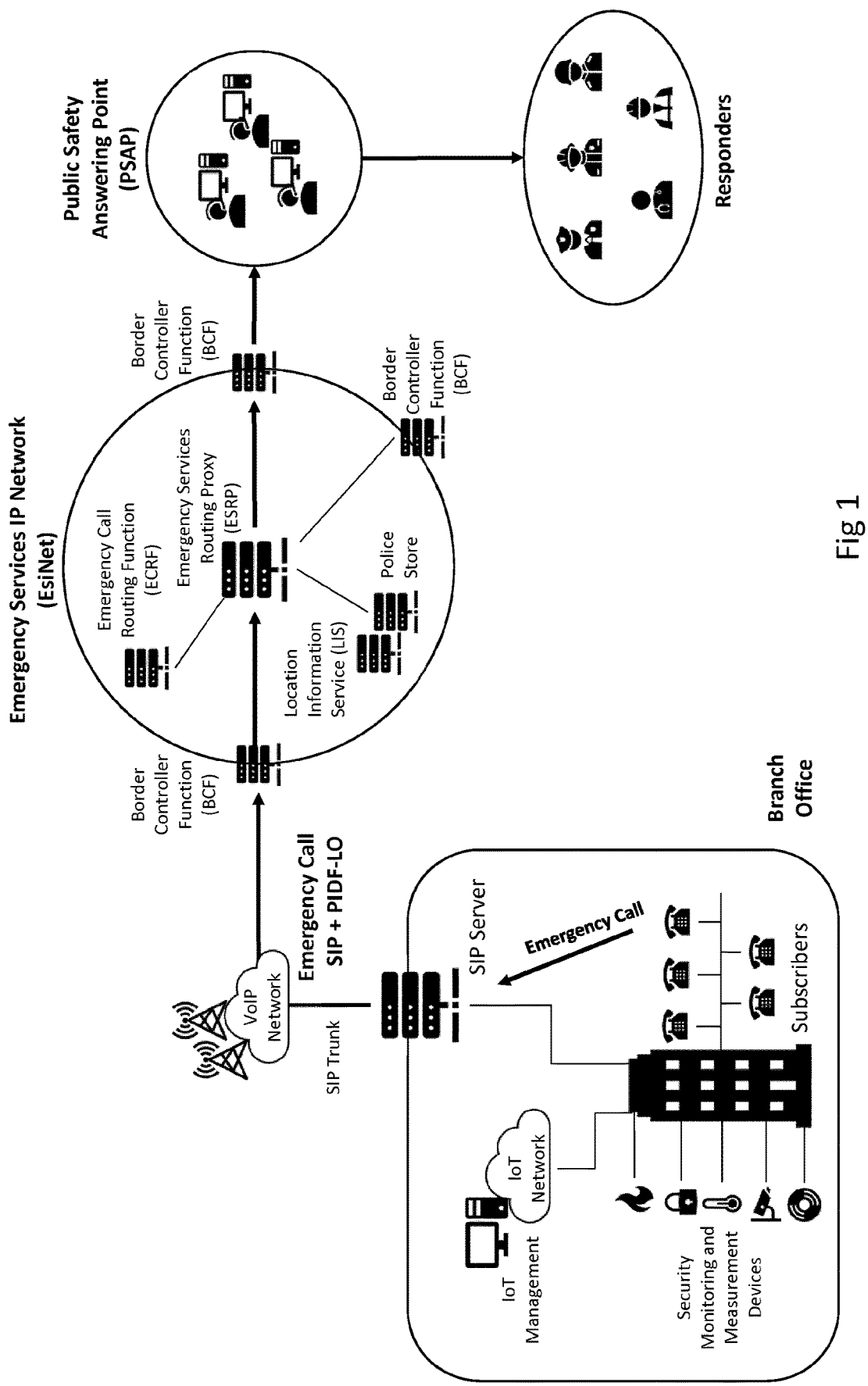
FIG. 1 schematically shows a scenario of a branch office with IoT monitoring devices connected to a local management according to an embodiment of the invention.

Reference numerals used in the drawings include:
1 branch office;
2 VoIP network;
3 SIP server;
4 IoT management;
5 emergency IP Network (EasiNet);
6 Border Control Function;
7 Emergency Service Routing Proxy;
8 IoT network;
9 IoT devices;
10 IoT gateway;
11 security monitoring and measurement devices;
12 originator of emergency call;
13 geo-location B;
14 geo-location A;
15 subscriber A;
16 video stream;
17 emergency responder; and
18 audio stream.

DETAILED DESCRIPTION

FIG. 1 schematically shows a branch office 1 connected to the Voice over IP (VoIP) network 2 by a SIP Server, in this case a SIP Proxy 3. The SIP Proxy 3 is a computer device having a processor connected to a non-transitory memory and at least one transceiver unit for communicative connections to other devices via at least one network. The SIP Proxy 3 is connected to Session Initiation Protocol (SIP) Service Provider that provides the access to the Public Switched Telephone Network (PSTN). All IoT devices 9, which in the embodiment shown here are security monitoring and measurement devices 11 are connected to a local management system 4 via an IoT network 8. The IoT devices 9 include hardware including a processor connected to a non-transitory memory and at least one transceiver unit for communicative connections to other devices via at least one network (e.g. the internet). Each IoT device can be connected to the internet via a router of a local area network or wireless local area network or other type of access point.

This location is served by the NG911 service, i.e., an Emergency IP Network Solution (EsiNet). The EsiNet 5 is composed by the Border Control Function 6 (BCF) and the Emergency Service Routing Proxy 7 (ESRP).

SIP Proxies 3 are elements that route SIP requests to user agent servers (UAS) and SIP responses to user agent clients. A request may traverse several proxies on its way to a UAS. Each will make routing decisions, modifying the request before forwarding it to the next element. Responses will route through the same set of proxies traversed by the request in the reverse order.

An emergency call can be recognized by a SIP Proxy 3 by comparing the R-URI to pre-defined list of emergency numbers. A call to a number in this list triggers the server 3 to establish an outgoing call to the PSTN. SIP Proxies 3 may support the conveyance of location information, i.e., the Geo-location header field and the Presence Information Data Format Location Object (PIDF-LO) according to the RFC5491. This information can be transparently forwarded or included by the server in the SIP INVITE message sent to the PSTN.

The SIP proxy 3 is able to associate a location information to the subscribers under it in many ways: the location information may be assigned to a single Destination Number (DN) or range of DNs, single IP number or IP subnet, or for physical ports in case of analog subscribers. The location information may be configured in the SIP Proxy 3 database in terms of civic location or other representation described in the RFC5491.

In case an emergency situation occurs, for example, a subscriber A (not shown in the figure), in this office 1, will generate an emergency call. Once the SIP Proxy 3 determines that it is an emergency call, the server checks if the Presence Information Data Format Location Object (PIDF-LO) was received or must be included in the SIP INVITE message body and sends this message via the SIP trunk in order to reach the Emergency Service of the EsiNet 5.

However, a plurality of IoT devices 9 are connected in this branch office 1. Thus, according to the embodiment illustrated in this scenario, the private IoT network 8 is connected to the SIP network via a SIP proxy 3 in order to take advantage of the IoT devices 9 in a branch office 1 in case of emergency situations. This includes:
an association of subscribers and IoT devices 9 even if they are not in the same location;
a definition of a method to unify the data format used to transmit the information collected from IoT devices 9 to the emergency services by usage of the PIDF object;
a definition of a method to include the PIDF object with IoT device data in an emergency call;
a definition of a method to generate automatic emergency calls from IoT device events; and/or a definition of a method to provide real time data from IoT devices 9 using Message Session Relay Protocol (MSRP) or video stream.

Figure 2:
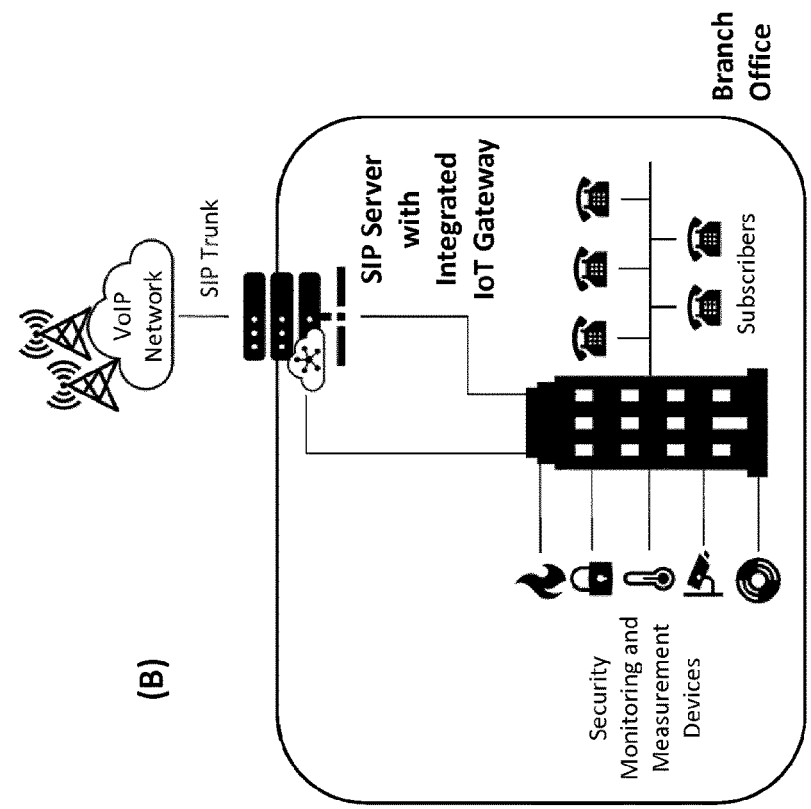
FIG. 2A illustrates an exemplary embodiment of an approach to connect the IoT devices to the SIP server according to an embodiment of the invention.
FIG. 2B illustrates an exemplary embodiment of an approach to connect the IoT devices to the SIP server according to an embodiment of the invention.
Figure 2:
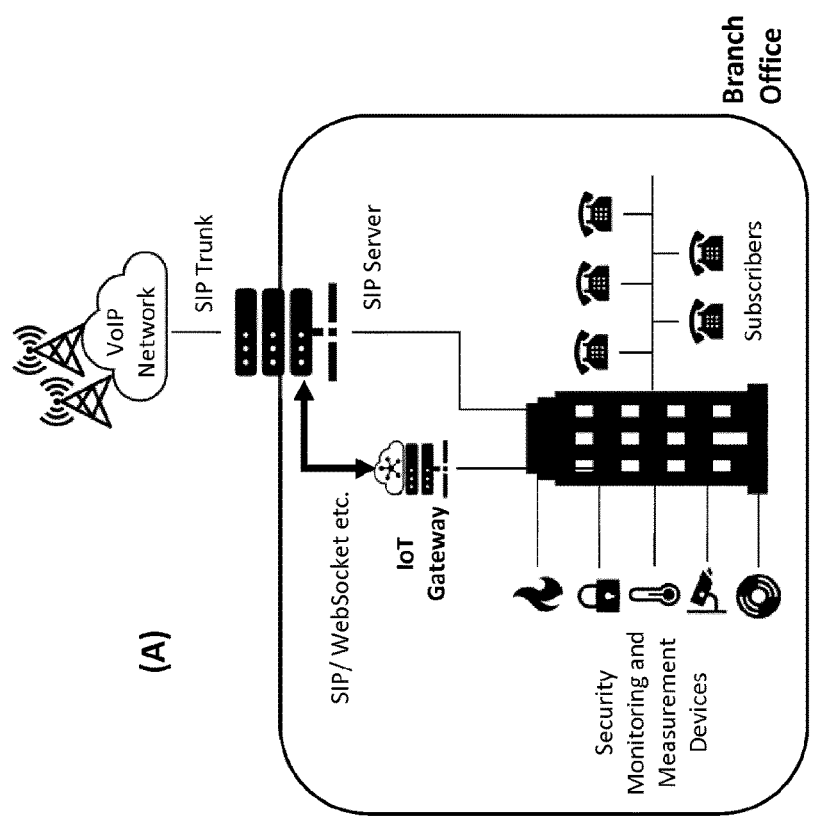

FIG. 2A and FIG. 2B illustrate two approaches to connect the IoT devices 9 to the SIP proxy 3 according to an embodiment of the invention, whereby in FIG. 2A, the IoT management system 4 shown in FIG. 1, here, is replaced by an IoT gateway 10 connected to the SIP proxy 3. The communication between them can be achieved using SIP, Websocket, or any other communication protocol over IP. In FIG. 2B, the IoT devices 9 are connected directly to the SIP proxy 3. In this case, the SIP proxy 3 is enhanced with any one of the available frameworks to communicate with the security monitoring and measurement devices 11.

In both approaches, the SIP proxy 3 has access to the IoT devices 9 connected to it. By a unique identifier, for instance, the IP address, the SIP proxy 3 may associate IoT devices 9 to location information as it is also done for the subscribers. The location of the IoT devices 9 may be also received from the IoT Gateway 10.

Figure 3:
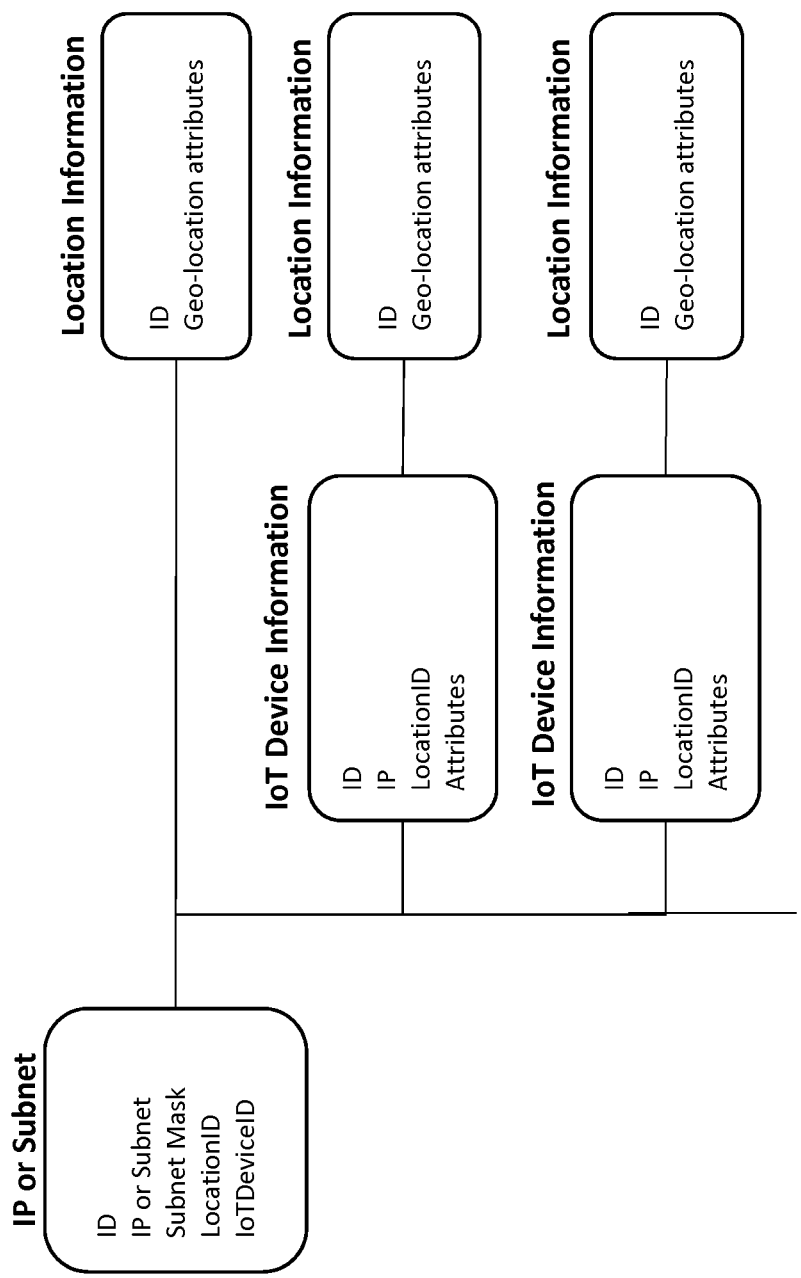
FIG. 3 illustrates an exemplary embodiment of how subscribers and IoT devices are associated in a SIP server.

FIG. 3 illustrates how subscribers and IoT devices 9 can be associated in a SIP proxy 3 (see FIG. 1). The Presence Information Data Format (PIDF) defined by RFC3863 can be extended to transport IoT devices data to the EsiNet (for example EsiNet 5 shown in FIG. 1). The PIDF-LO used to transport the geo-location information is an example of extended PIDF. The PIDF format provides an unlimited number of tuple, device or person elements. Each IoT device 9 can be identified as a "device" element. Each device element is identified by a unique ID.

The PIDF optionally contains a "contact" element that is the URL of the contact address that shows how a person or entity responsible for this device can be reached. It is noted that in the emergency services context, some situations require callback to the emergency call originator. The PIDF optionally contains a "timestamp" element that designates the time at the PIDF document was created giving some idea of when the IoT device data was collected.

Each tuple, device or person element contains a single status element. The RFC3863 defines the status element as extensible, i.e., this element may contain any number of extension elements that can be defined to inform the status of each IoT device 9 according to their specificities. By categorizing the security monitoring and measurement devices, a set of relevant data can be defined in terms of status elements such as temperature, smoke presence, distance, alarm detected, etc. The PIDF document is an XML document; this extension may be defined in terms of the XML schema. For example:

```
<?xml version="1.0" encoding="UTF-8"?>
<xs:schema targetNamespace="urn:ietf:params:xml:ns:pidf:status"
xmlns:tns="urn:ietf:params:xml:ns:pidf:status"
xmlns:xs="http://www.w3.org/2001/XMLSchema"
elementForm Default="qualified"
attributeForm Default="unqualified">
<xs:complexType name="temperature">
    <xs:element name="value" type="xs:integer"/>
    <xs:element name="unit">
        <xs:restriction base="xs:string">
            <xs:enumeration value="C"/>
            <xs:enumeration value="F"/>
            <xs:enumeration value="K"/>
        </xs:restriction>
    </xs:complexType>
</xs:schema>
```

A single PIDF document may provide the information on the location of subscribers and IoT devices 9 by the PIDF-LO as well as the status of these devices using this new PIDF extension. The same information may also be sent in multiple PIDF documents.

Considering the PIDF-LO is already supported by the NG911 services, the usage of the PIDF extension may easily integrate emergency services and IoT devices 9 for the following reasons. First of all, the EsiNet does not have to implement a dedicated service to support different protocols, message flows or data format used by the IoT devices 9. On the other hand, the call containing the monitoring data may be routed inside the EsiNet as a common emergency call. Besides the SIP protocol, the PIDF document may be sent in the body of any protocol capable to carry an XML document.

Figure 4:
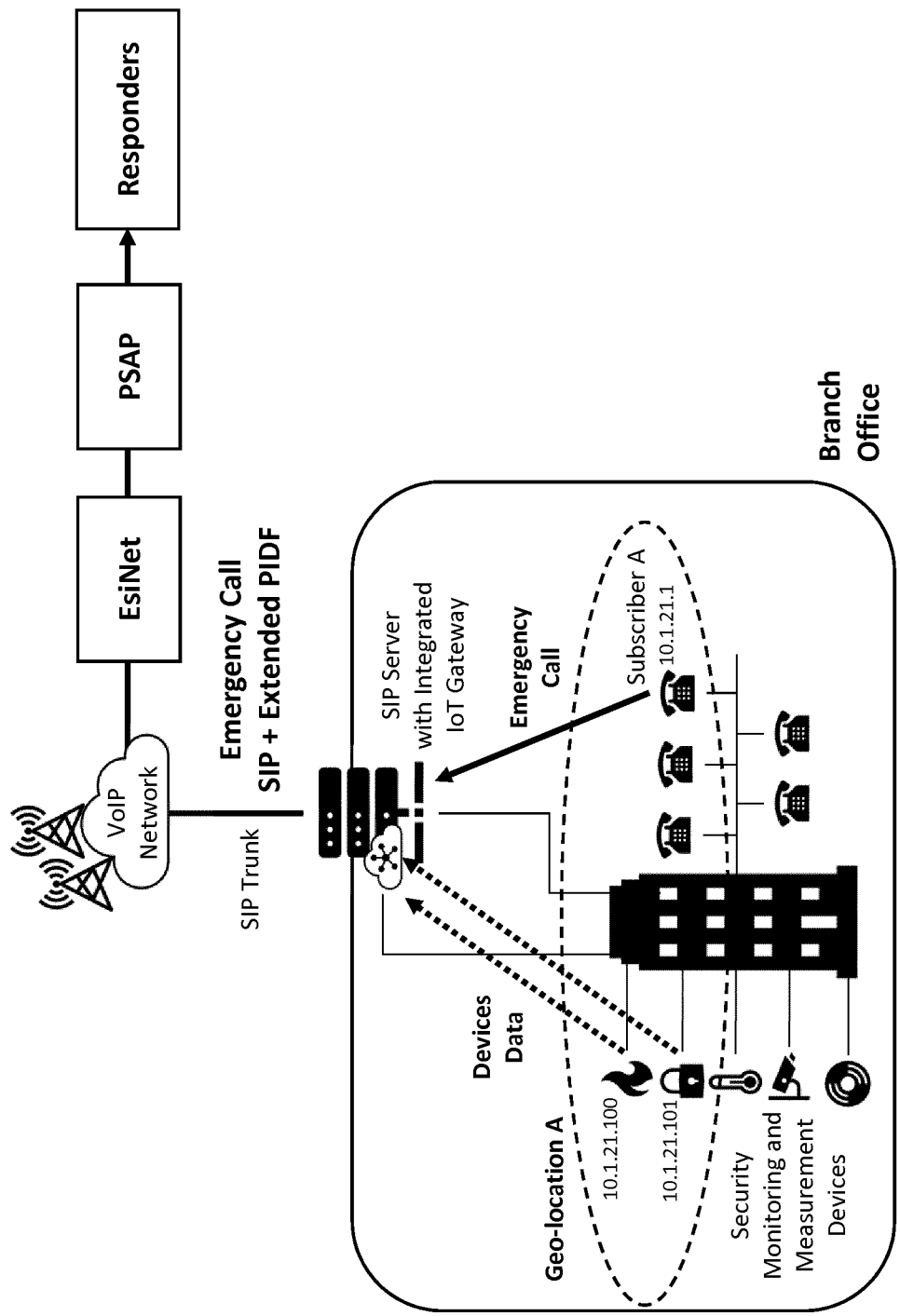
FIG. 4 schematically shows another scenario of a branch office according to an embodiment of the invention.

FIG. 4 illustrates a scenario according to another embodiment of the invention, whereby a method of enhanced emergency calls with extended PIDF is implemented. Here, the subscriber A is considered as being the originator 12 of the emergency call. Its IP address is within emergency subnet 10.1.21.0 previously configured. To this subnet two IoT devices 9 are associated: a smoke detector, IP address 10.1.21.100 and a smart locker, IP address 10.1.21.101. Both devices 9 are in the same subnet 10.1.21.0 and in this case, they have the same geo-location A of the subscriber A. Besides the location of the IoT devices 9, the SIP proxy 3 may consult relevant data provided by them. With this data, it creates an enhanced PIDF document, including the geo-location of subscriber originator 12 of the emergency call, the current snapshot data of IoT monitoring devices 11 associated to that subscriber, as indicated below.

```
<presence>
    <tuple id=osbranch-1>
        <status>
            <geopriv>
                <location-info>
                geo-location A
            </geopriv>
        </status>
    </tuple>
    <device id=smokedetector-1>
        <status>
            <geopriv>
                <location-info>
                geo-location A
            </geopriv>
            <temperature>
                <value>36</value>
                <unit>C</unit>
            </temperature>
        </status>
    </device>
    <device id=presencedetector-1>
    . . .
</presence>
```

Thus, this PIDF document is included in the SIP INVITE message sent to the EsiNet 5 via the SIP Service Provider. Once arrived in the EsiNet 5, this call can be routed as any other call with PIDF-LO.

Figure 5:
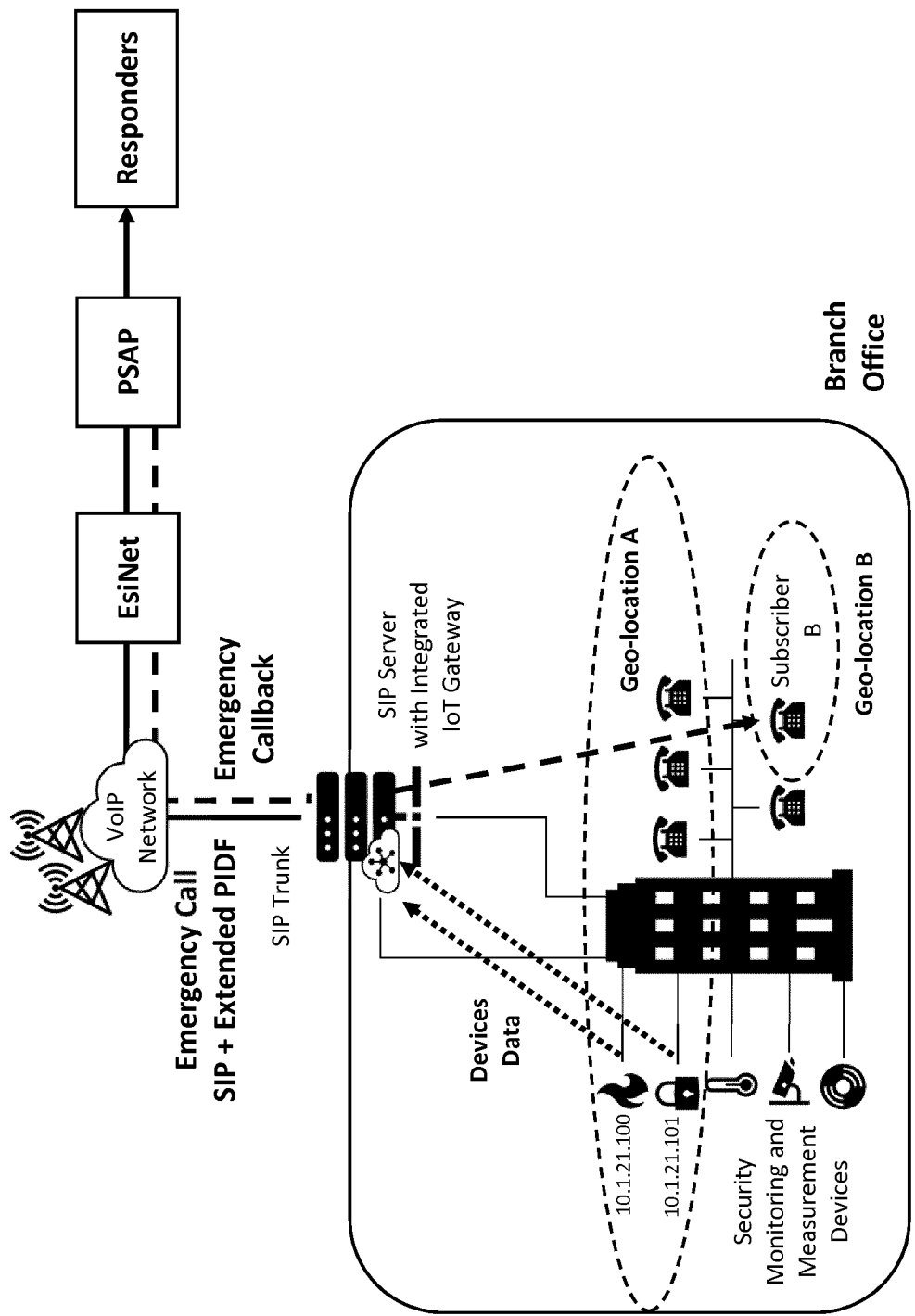
FIG. 5 schematically illustrates another scenario for automatic emergency calls with extended PIDF providing callback contact information according to an embodiment of the invention.

FIG. 5 schematically illustrates another scenario for automatic emergency calls based on an IoT event using the extended PIDF providing callback contact information according to an embodiment of the invention. Here, once a critical event is notified by any of the security monitoring and measurement devices 11 in the branch office, the SIP proxy 3 calls a predefined destination that may be or not the emergency service, in order to provide information on the situation.

Considering, for example, the smoke detector, IP address 10.1.21.100, in the FIG. 5, which is one of the security monitoring and measurement devices 11, this sensor is located within the subnet 10.1.21.0 with geo-location A, indicated by reference numeral 14. This sensor is also associated to the subscriber B, with geo-location B, indicated by reference numeral 13. Once the sensor detects some smoke, the SIP proxy 3 is notified and automatically calls the predefined destination, in this case the emergency service. The SIP INVITE message sent by the SIP proxy 3 includes the location (PIDF-LO) and data (new extended PIDF) of the smoke detector as well as the subscriber B contact as being responsible for this device.

When the call is answered, an Interactive Voice Response (IVR; not shown), the media server or other system application capable to play a voice message can be used to play an announcement to the called party. Alternatively, a text message can be sent via the Message Session Relay Protocol (MSRP). The EsiNet 5 already supports the MSRP.

With the PIDF data included in the SIP INVITE or other SIP method, the called party is able to callback subscriber B to provide additional assistance.

Figure 6:
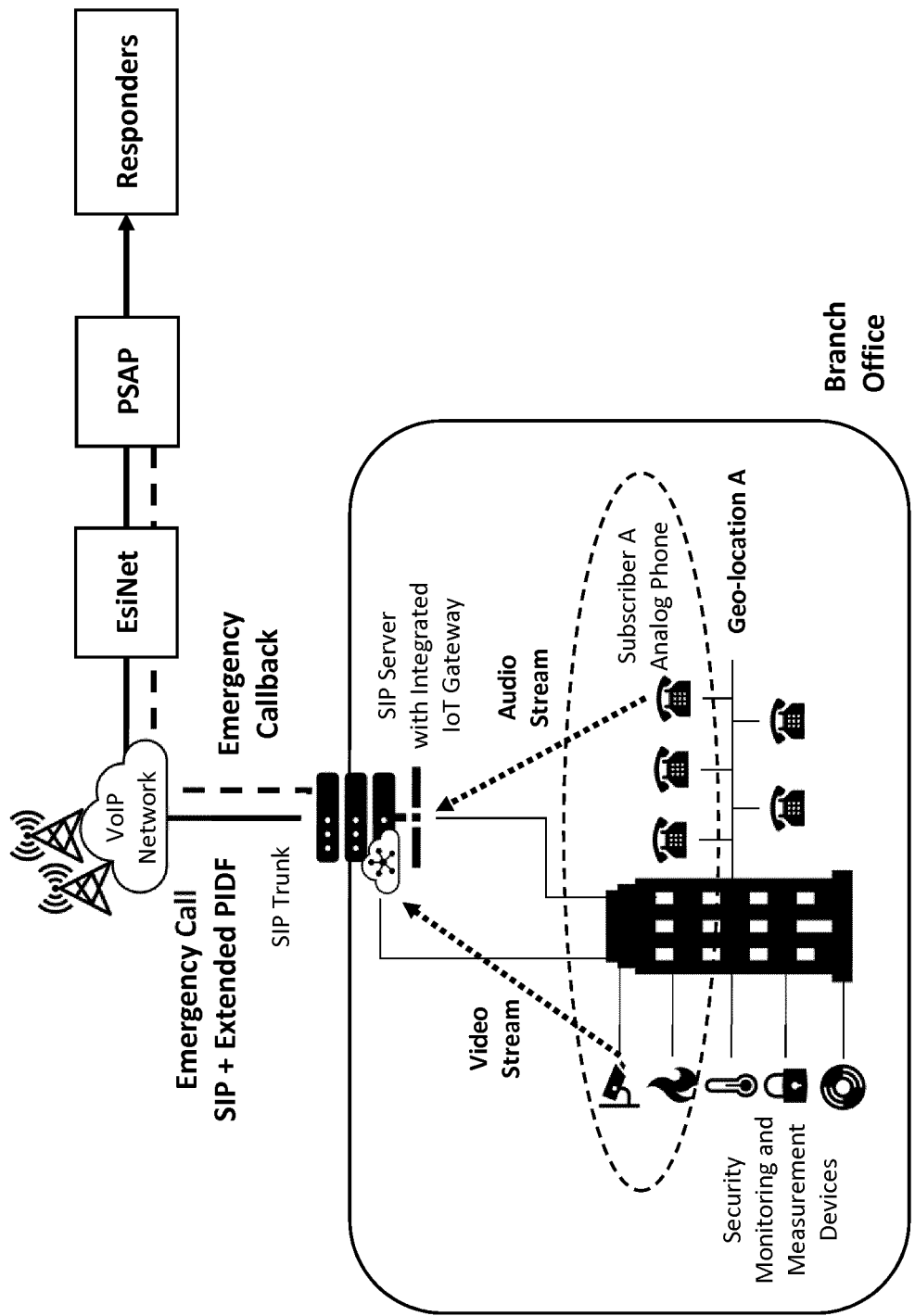
FIG. 6 schematically illustrates another embodiment for a scenario to provide emergency video calls.

FIG. 6 illustrates schematically another embodiment for a scenario to provide emergency video calls. Here, the SIP proxy 3 may also send IoT device data via payload. This is especially applicable when it is intended to share real time data provided by devices such as cameras. Currently, security and monitoring systems send an alarm message to a central monitoring station. Even the emergency calls enhanced with the extended PIDF where additional information from the IoT devices 9 is included cannot be visually confirmed. Besides that, an emergency situation in which, for example, medical assistance is required, the possibility to see the situation in in real-time may help the responder to provide better assistance.

Thus, when the emergency call is generated by a device that is able to provide video calls such as cellphones, PC with webcams, etc, the video stream 16 may be transmitted to the emergency responder 17. Considering the Subscriber A in FIG. 6, indicated by reference numeral 15, the latter may generate an emergency call in order to obtain medical assistance. Subscriber A is an analog device and does not have any camera, however, in that room there is a surveillance IoT camera 9', 11' connected to the SIP proxy 3. The SIP proxy 3 knows that subscriber A and the IoT camera 9', 11' are associated; internally, the SIP proxy 3 creates a bridge between the audio stream 18 from the subscriber A and the video stream 16 provided by the IoT camera 9', 11' generating a single media stream to the EsiNet 5 for which this is a common video call, routed normally inside the network.

The call enhanced with video can also be applied to the emergency callback calls where the call is originated outside the branch office to a device in the branch office.

Thus, summarizing the above, according to the embodiments described above, private monitoring devices are connected to public the Emergency Response Service using capabilities already supported by the EsiNet. The EsiNet does not have to implement a dedicated service to support different protocols, message flows or data format used by the IoT devices. The call containing the monitoring data may be routed inside the EsiNet as a common emergency call. Besides the SIP protocol, the PIDF document may be sent in the body of any protocol capable to carry an XML document. Besides the public Emergency Services, the embodiments described above may be extended to any private security or monitoring service.

It should be appreciated that different embodiments of the method, communication system, and a communication apparatus can be developed to meet different sets of design criteria. For example, the particular type of network connection, server configuration or client configuration for a device for use in embodiments of the method or system can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, method for providing an emergency response service, apparatus for providing an emergency response service, telecommunication device, terminal device, a network, a server, a communication system, and methods of making and using the same have been shown and described above, it is to be distinctly understood that the invention is not limited thereto but may be otherwise variously embodied and practiced within the scope of the following claims.

The invention claimed is:

1. A method for providing an emergency response service, wherein an emergency call initiated by a subscriber via a first subscriber device due to an emergency situation is received by a server together with location information, and wherein the server associates the location information with the subscriber that initiated the emergency call, the method comprising:
   associating, in the server, the at least one Internet of Things (IoT) device to the location information received with the emergency call;
   connecting the at least one IoT associated with the location information with the server for the server to acquire real time data associated with the emergency situation from the at least one IoT in response to receipt of the emergency call and the associating of the IoT to the location information;
   receiving at the server, from the at least one IoT device, the real time data associated with the emergency situation; and
   transmitting, by the server, the real time data associated with the emergency situation received from the at least one IoT to an emergency service routing proxy (ESRP) of an emergency network solution.

2. The method of claim 1, wherein the real time data is received from the at least one IoT device using Message Session Relay Protocol (MSRP) or a video stream.

3. The method of claim 1, wherein the at least one IoT device is a security monitoring and measurement device located in a branch office of the subscriber or adjacent to the branch office of the subscriber.

4. The method of claim 1, comprising:
   associating the location information to the subscriber.

5. The method of claim 4, wherein the location information is associated to the subscriber by assigning it to a single Destination Number (DN) or a range of DNs, a single internet protocol (IP) number of an IP subnet, or to a physical port.

6. The method of claim 1, comprising:
   associating the subscriber with the at least one IoT device.

7. The method of claim 1, wherein the at least one IoT device is a sensor and/or a monitoring device.

8. The method of claim 1, comprising:
extending Presence Information Data Format (PIDF) for transporting data received from the at least one IoT device to the ESRP.

9. The method of claim 8, wherein a Presence Information Data Format Location Object (PIDF-LO) is used for transporting the location information of the at least one IoT device to the ESRP.

10. The method of claim 1, comprising:
automatically generating an emergency call from an IoT device event.

11. The method of claim 1, comprising:
extending Presence Information Data Format (PIDF) for transporting data received from the at least one IoT device to the ESRP, wherein the PIDF comprises a contact element.

12. The method of claim 11, wherein the contact element is a uniform resource locator (URL) of a contact address indicating how a person or entity of the at least one IoT device is reachable.

13. The method of claim 12, wherein the PIDF further comprises a timestamp element that designates a time at which the PIDF document was created.

14. The method of claim 13, wherein the PDIF document is an Extensible Markup Language (XML) document.

15. An emergency response service system comprising:
at least one branch office connected to a network by a server, the branch office being served by an Emergency IP Network Solution network such that:
at least one Internet of Things (IoT) device of the branch office connectable to the server via at least one network;
the at least one IoT device is associatable with location information for a subscriber via the server; and
the server is configured to receive an emergency call from a calling device of the subscriber at the branch office and respond to the emergency call by determining the location information and connecting to the at least one IoT associated with the location information to receive real time data associated with an emergency situation of the emergency call from the at least one IoT device; and
the server is configured to send the real time data associated with the emergency situation to an emergency service routing proxy (ESRP) and also facilitate a connection of the emergency call made via the calling device of the subscriber to the ESRP.

16. The emergency response service system of claim 15, wherein the at least one IoT device is connected to the server, the at least one IoT device being connected to an IoT management system or to an IoT gateway.

17. The emergency response service system of claim 15, wherein the server is a session initiation protocol (SIP) server having a processor connected to a non-transitory memory and at least one transceiver.

18. The emergency response service system of claim 17, wherein an IoT gateway is integrated into the server.

* * * * *